United States Patent
Nakata

(10) Patent No.: US 10,871,822 B2
(45) Date of Patent: Dec. 22, 2020

(54) IMAGE GENERATION APPARATUS, IMAGE GENERATION SYSTEM, AND IMAGE GENERATION METHOD

(71) Applicant: SONY INTERACTIVE ENTERTAINMENT INC., Tokyo (JP)

(72) Inventor: Daisuke Nakata, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/309,587

(22) PCT Filed: Jun. 14, 2017

(86) PCT No.: PCT/JP2017/021954
§ 371 (c)(1),
(2) Date: Dec. 13, 2018

(87) PCT Pub. No.: WO2017/221784
PCT Pub. Date: Dec. 28, 2017

(65) Prior Publication Data
US 2019/0317595 A1    Oct. 17, 2019

(30) Foreign Application Priority Data
Jun. 21, 2016  (JP) ................................ 2016-122976

(51) Int. Cl.
*G06T 15/00*    (2011.01)
*G06F 3/01*    (2006.01)
(Continued)

(52) U.S. Cl.
CPC ......... *G06F 3/013* (2013.01); *G02B 27/0172* (2013.01); *G06F 3/012* (2013.01); *H04N 13/111* (2018.05); *H04N 13/332* (2018.05)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 2005/0156817 A1* | 7/2005 | Iba ...................... G02B 27/017 345/8 |
| 2013/0095924 A1* | 4/2013 | Geisner .................. G06F 3/012 463/32 |

(Continued)

FOREIGN PATENT DOCUMENTS

| JP | 2007-188332 A | 7/2007 |
| JP | 2008-204145 A | 9/2008 |

(Continued)

OTHER PUBLICATIONS

International Search Report and Written Opinion dated Aug. 8, 2017, from International Application No. PCT/JP2017/021954, 8 sheets.

(Continued)

*Primary Examiner* — Gordon G Liu
(74) *Attorney, Agent, or Firm* — Katten Muchin Rosenman LLP

(57) ABSTRACT

An image processing section 750 draws an image viewed in a line-of-sight direction from a viewpoint position at a certain time. An image storage section 760 holds the image drawn by the image processing section 750 as past frames. A past frame selection section 790 selects, from among the past frames held in the image storage section 760, a substitute image to be viewed in the line-of-sight direction from a current viewpoint position. An image providing section 770 outputs the substitute image before providing the image viewed in the line-of-sight direction from the current viewpoint position, drawn by the image processing section 750.

6 Claims, 14 Drawing Sheets

(51) Int. Cl.
*H04N 13/332* (2018.01)
*H04N 13/111* (2018.01)
*G02B 27/01* (2006.01)

(58) Field of Classification Search
USPC .......................................... 345/419
See application file for complete search history.

(56) References Cited

U.S. PATENT DOCUMENTS

| 2014/0184724 | A1* | 7/2014 | Cho | G02B 27/017 |
| | | | | 348/14.07 |
| 2016/0282619 | A1* | 9/2016 | Oto | G02B 27/017 |
| 2017/0262052 | A1* | 9/2017 | Richmond | G06T 11/60 |

FOREIGN PATENT DOCUMENTS

| JP | 2012-33038 A | 2/2012 |
| WO | 2015/068656 A1 | 5/2015 |

OTHER PUBLICATIONS

International Preliminary Report on Patentability dated Jan. 3, 2019, from International Application No. PCT/JP2017/021954, 8 sheets.

\* cited by examiner

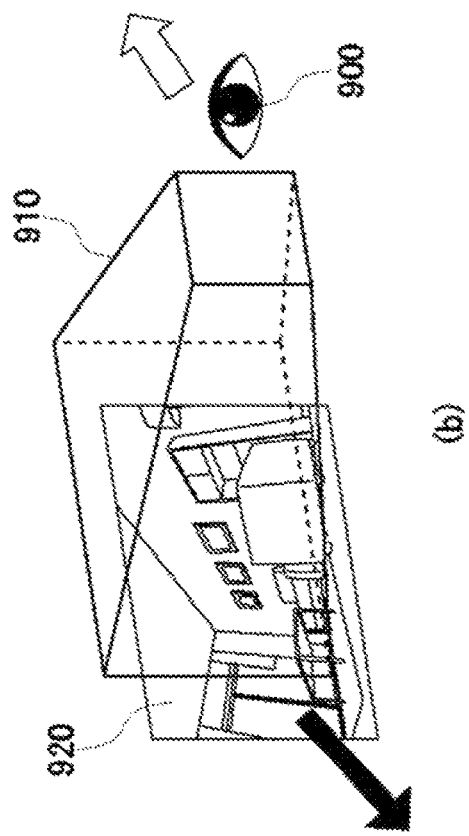
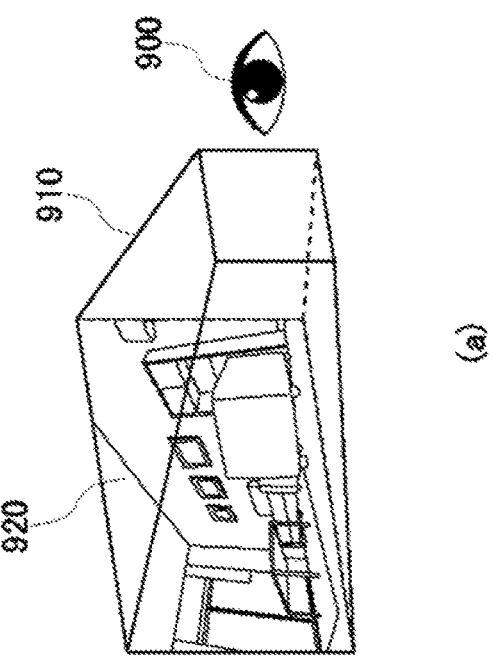
FIG. 7

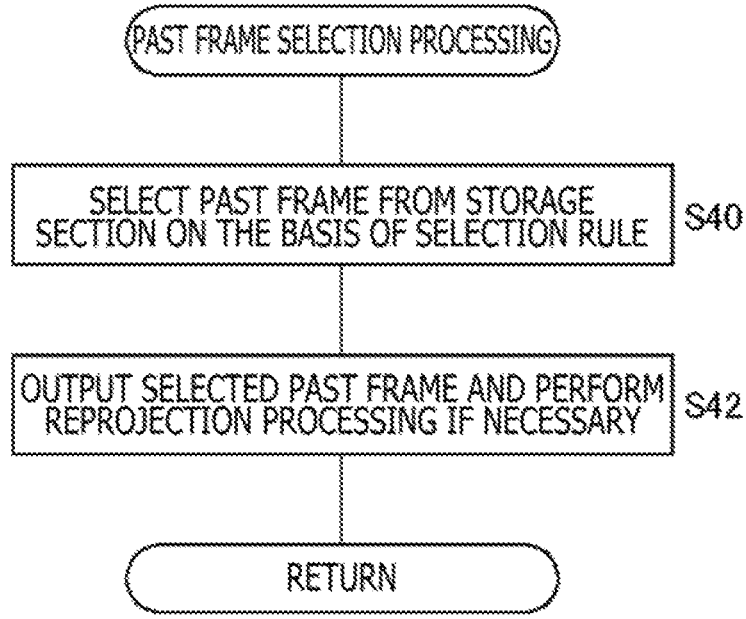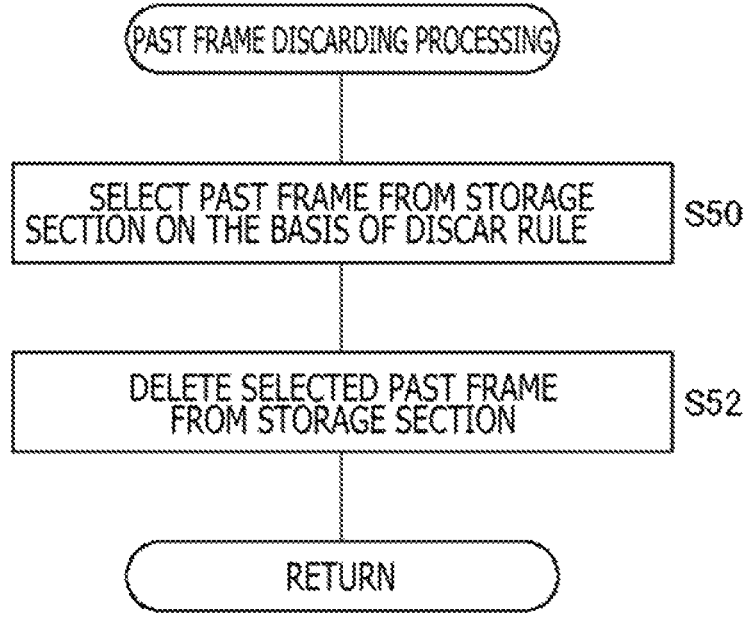

IMAGE GENERATION APPARATUS, IMAGE GENERATION SYSTEM, AND IMAGE GENERATION METHOD

TECHNICAL FIELD

The present invention relates to an apparatus, system, and method for generating an image.

BACKGROUND ART

A head-mounted display (HMD) connected to a game machine is worn on the head in such a manner that a user operates a controller etc. and performs gameplay while viewing a screen displayed on the head-mounted display. When the head-mounted display is worn, the user does not view any image except a video displayed on the head-mounted display. Therefore, an effect in which immersion feeling in a video world becomes higher and an entertainment property of a game is more enhanced is exerted. Further, a virtual reality video is displayed on the head-mounted display and the user who wears the head-mounted display turns the head. When a virtual space of the entire periphery to overlook a 360-degree direction is displayed, the immersion feeling in a video becomes higher and even operability of an application of game etc. is further improved.

SUMMARY

Technical Problems

Thus, a head tracking function is allowed to be held in the head-mounted display and then a viewpoint and a line-of-sight direction are changed in conjunction with a motion of the head of the user to generate the virtual reality video. In such a case, since latency is generated from generation up to display of the virtual reality video, a deviation may be generated between a direction of the head of the user to be assumed at the time of generating the video and the direction of the head of the user at the time of displaying the video on the head-mounted display and the user may have a feeling as if the user feels sick. In addition, the virtual reality video generated by a server is received via a network and is displayed in a client. In such a case, a delay of the network is further added and therefore a deviation becomes large between a generation time and display time of the video.

The present invention has been made in view of the above circumstances. An object of the invention is to provide an image generation apparatus and an image generation method capable of displaying an image in consideration of latency from generation up to display of the image.

Solution to Problems

In order to solve the problems described above, an image generation apparatus according to a mode of the present invention includes an image generation section that draws an image viewed in a line-of-sight direction from a viewpoint position at a certain time, a storage section that holds the image drawn by the image generation section as past frames, a selection section that selects a substitute image to be viewed in the line-of-sight direction from a current viewpoint position from among the past frames held in the storage section, and an image providing section that outputs the substitute image before providing an image viewed in the line-of-sight direction from the current viewpoint position drawn by the image generation section.

Also another mode of the present invention is an image generation system. The image generation system includes a server, and a client that is connected to the server via a network. The server includes an image generation section that draws an image viewed in a line-of-sight direction from a viewpoint position at a certain time, a storage section that holds the image drawn by the image generation section as past frames, a selection section that selects a substitute image to be viewed in the line-of-sight direction from a current viewpoint position from among the past frames held in the storage section, and an image providing section that transmits the substitute image to the client before providing an image viewed in the line-of-sight direction from the current viewpoint position drawn by the image generation section. The client includes a reprojection section that performs processing of deviating the substitute image received from the server in accordance with a motion amount of at least one of the viewpoint position and the line-of-sight direction.

A further mode of the present invention is an image generation method. The method includes an image generation step of drawing an image viewed in a line-of-sight direction from a viewpoint position at a certain time, a storage step of holding the image drawn in the image generation step as past frames, a selection step of selecting a substitute image to be viewed in the line-of-sight direction from a current viewpoint position from among the held past frames, and an image providing step of outputting the substitute image before providing an image viewed in the line-of-sight direction from the current viewpoint position drawn in the image generation step.

Where suitable combinations of the above-described elements or the above expressions of the present invention are converted between different forms such as a method, a device, a system, a computer program, a data structure, and a recording medium, they still constitute effective embodiments of the present invention.

Advantageous Effect of Invention

According to the present invention, it is possible to display an image in consideration of latency from generation up to display of the image.

BRIEF DESCRIPTION OF DRAWINGS

FIGS. 7(a) and 7(b) are diagrams describing a reprojection.

FIG. 13 is a flowchart illustrating a procedure of the past frame selection processing illustrated in FIG. 12.

FIG. 14 is a flowchart illustrating a procedure of the past frame discarding processing illustrated in FIG. 12.

DESCRIPTION OF EMBODIMENT

Figure 1:
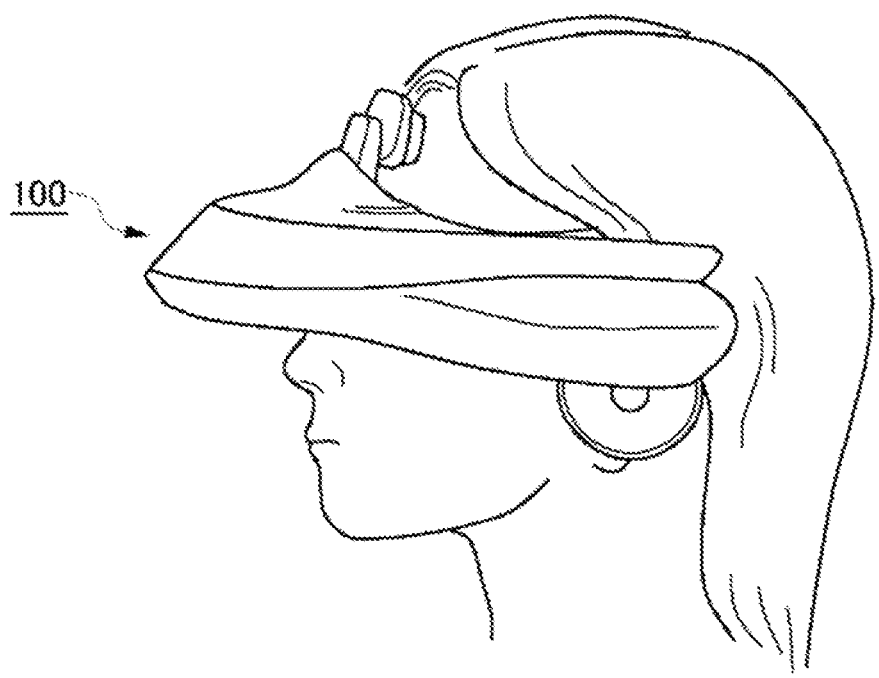
FIG. 1 is an external diagram of a head-mounted display.

FIG. 1 is an external diagram of a head-mounted display 100. The head-mounted display 100 is a display apparatus that is worn on the head of the user in such a manner that the user appreciates a still image, a moving image, or the like displayed on a display and listens to sound, music, or the like output from a headphone.

A gyro sensor, an acceleration sensor, or the like incorporated in or externally attached to the head-mounted display 100 permits measurement of posture information such as a rotation angle and inclination of the head and positional information of the user's head wearing the head-mounted display 100.

On the head-mounted display 100, further, a camera that photographs the eyes of the user may be provided. It is possible to detect a gaze direction, motions of pupils, blinks, and the like of the user by using the camera mounted on the head-mounted display 100.

The head-mounted display 100 is an example of a "wearable display." Here, a method for generating an image displayed on the head-mounted display 100 will be described. In addition to the head-mounted display 100 in a narrowly defined sense, the image generation method of the present embodiment is applicable to even a case in which glasses, a glass type display, a glass type camera, headphones, a headset (headphones equipped with a microphone), earphones, earrings, an ear-hanging camera, a hat, a camera-equipped hat, a hairband, or the like is worn.

Figure 2:
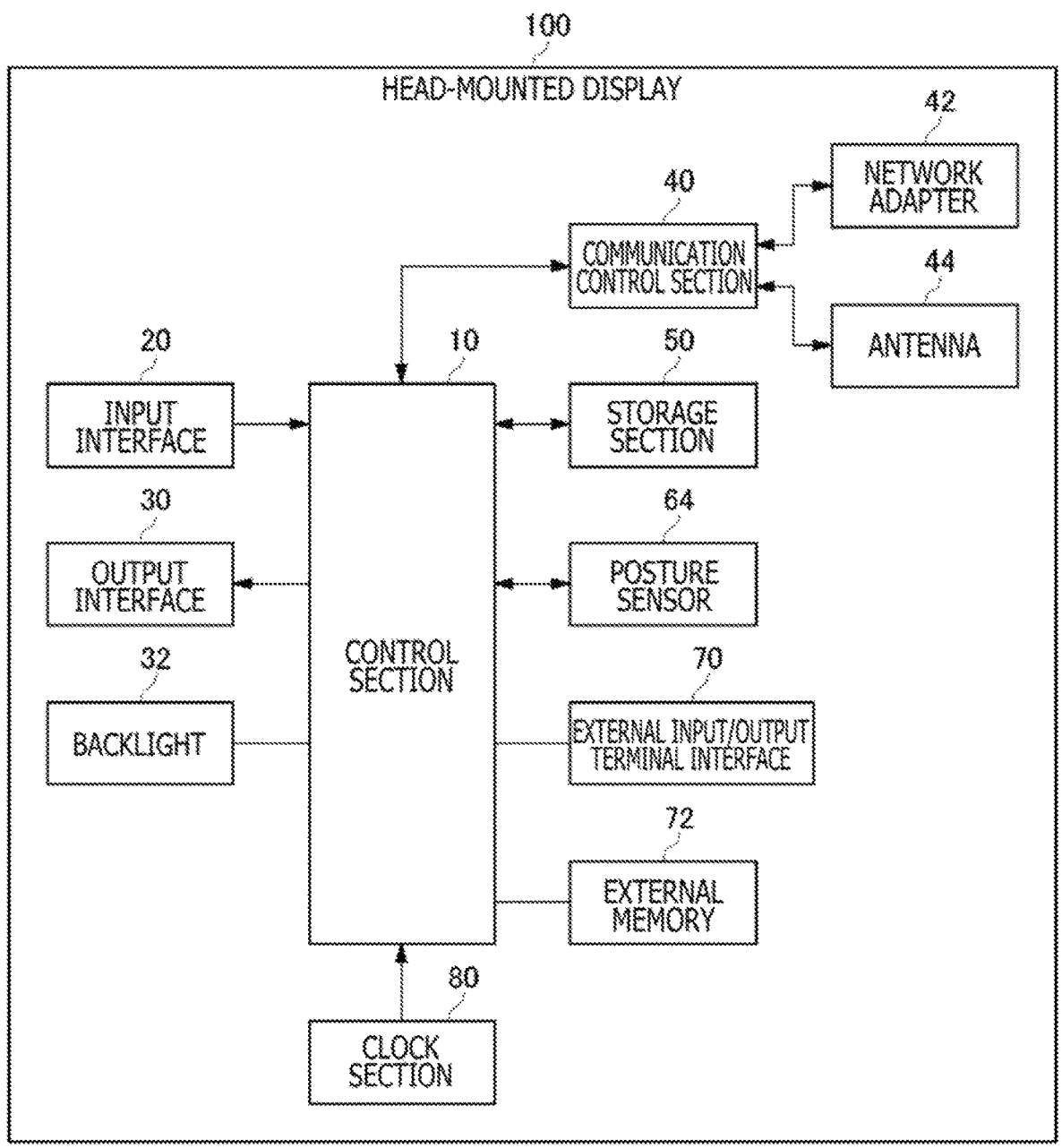
FIG. 2 is a functional configuration diagram of the head-mounted display.

FIG. 2 is a functional configuration diagram of the head-mounted display 100.

A control section 10 is a main processor that processes and outputs signals such as image and sensor signals as well as instructions and data. An input interface 20 receives operating and setting signals from the user and supplies the operating and setting signals to the control section 10. An output interface 30 receives the image signal from the control section 10 and has the image signal displayed on the display. A backlight 32 supplies backlight to a liquid crystal display.

A communication control section 40 transmits data input from the control section 10 to the outside via a network adapter 42 or an antenna 44 in wired or wireless communication. Also, the communication control section 40 receives data from the outside via the network adapter 42 or the antenna 44 in wired or wireless communication and outputs the received data to the control section 10.

A storage section 50 temporarily stores data, parameters, operating signals, and the like to be processed by the control section 10.

A posture sensor 64 detects the posture information such as a position, rotation angle, and inclination of the head-mounted display 100. The posture sensor 64 is implemented by suitably combining a gyro sensor, an acceleration sensor, and an angular acceleration sensor, for example. The motion of backward-and-forward, right-and-left, and up-and-down directions of the user's head may be detected by using a motion sensor obtained by combining at least one or more of a triaxial geomagnetic sensor, a triaxial acceleration sensor, and a triaxial gyro (angular velocity) sensor.

An external input/output terminal interface 70 is an interface for connecting peripheral devices such as a universal serial bus (USB) controller. An external memory 72 is an external memory such as a flash memory.

A clock section 80 sets time information on the basis of the setting signals from the control section 10 and supplies time data to the control section 10.

The control section 10 can supply images and text data to the output interface 30 for display on the display, or supply them to the communication control section 40 for transmission to the outside.

Figure 3:
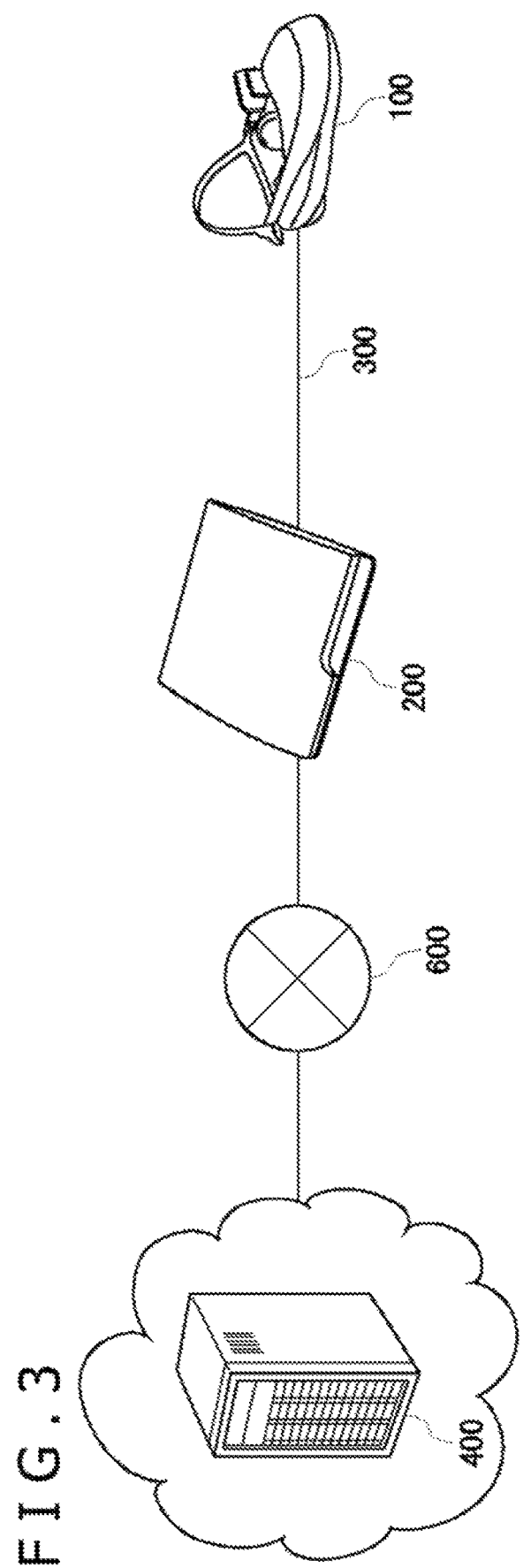
FIG. 3 is a configuration diagram of an image generation system according to an embodiment.

FIG. 3 is a configuration diagram illustrating an image generation system according to the present embodiment. The head-mounted display 100 is connected to a client 200 such as a game machine, a personal computer, or a mobile terminal via an interface 300 that connects peripheral equipment such as wireless communication or a USB. The client 200 is further connected to a server 400 via a network 600. The server 400 can provide a cloud service. The server 400 is not limited to a single set and further may be provided in plurality. Further, the plurality of servers 400 may carry out one task by using distributed processing.

The server 400 can transmit the virtual reality video to a plurality of clients 200 via the network 600. A plurality of users wear the head-mounted display 100 connected to the respective clients 200 and browse the virtual reality video from respective viewpoints.

Figure 4:
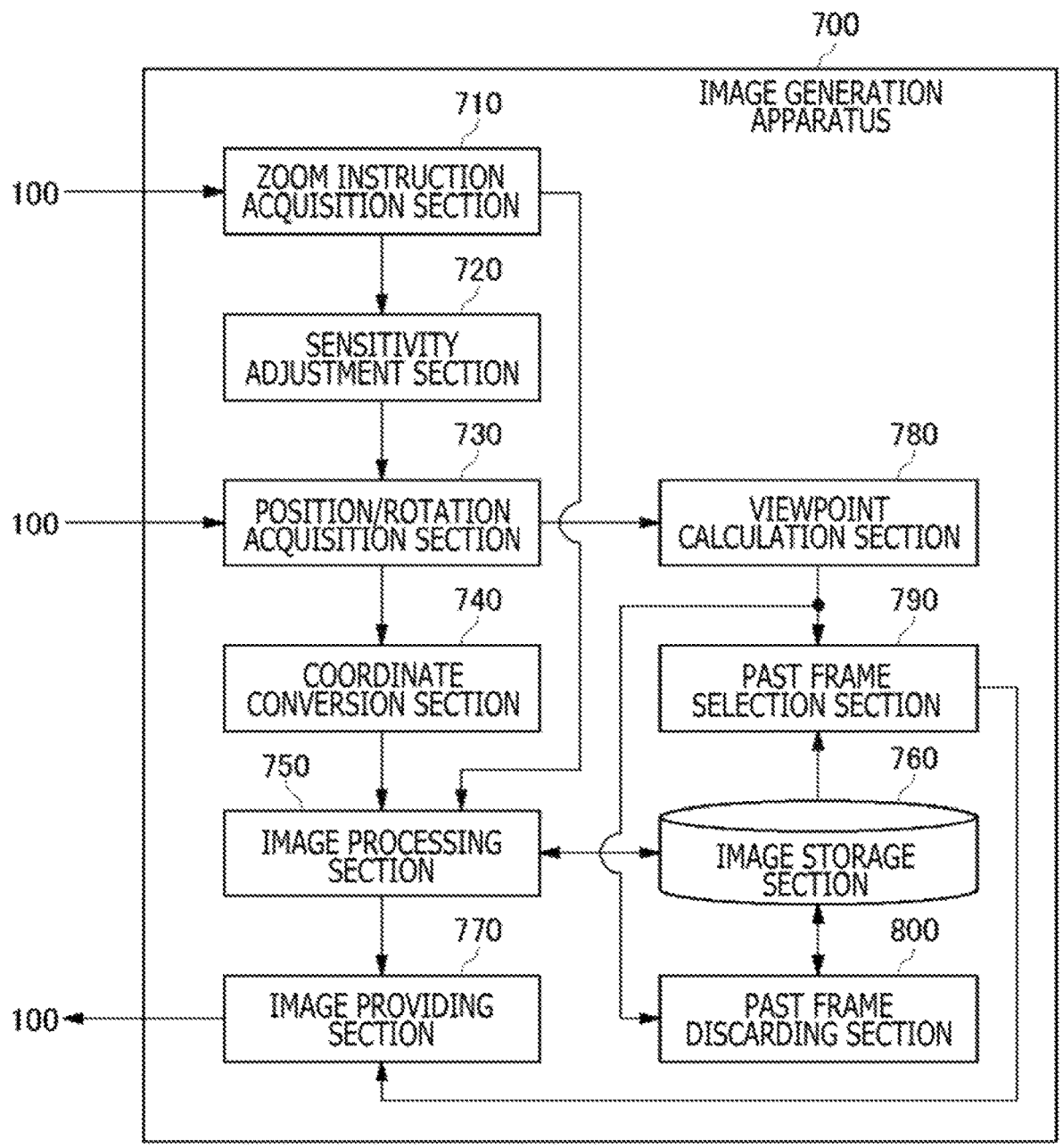
FIG. 4 is a functional configuration diagram of an image generation apparatus according to the embodiment.

FIG. 4 is a functional configuration diagram illustrating an image generation apparatus 700 according to the present embodiment. The figure depicts a block diagram aimed at the functions. These functional blocks may be implemented variously by hardware alone, by software alone, or by combinations of both.

In the case of a server client system in which the client 200 is connected to the server 400, the image generation apparatus 700 is implemented in the server 400. In the case of a stand-alone system in which the client 200 is not connected to the server 400 and is used as a single body, the image generation apparatus 700 is implemented in the client 200. In the case of the server client system, a portion of a functional configuration of the image generation apparatus 700 may be implemented in the server 400 and the remaining functional configuration may be implemented in the client 200. Even in any case of the server client system and the stand-alone system, at least a portion of function of the image generation apparatus 700 may be implemented in the control section 10 of the head-mounted display 100.

A zoom instruction acquisition section 710 acquires zoom magnification instructed by the user via the input interface 20 of the head-mounted display 100. The zoom magnification acquired by the zoom instruction acquisition section 710 is provided for a sensitivity adjustment section 720 and an image processing section 750.

A position/rotation information acquisition section 730 acquires information regarding a position and rotation of the head of the user who wears the head-mounted display 100 on the basis of the posture information detected by the posture sensor 64 of the head-mounted display 100.

The position/rotation information acquisition section 730 acquires the position and rotation of the head of the user on the basis of sensitivity instructed by the sensitivity adjustment section 720. For example, when the user turns the neck, a change in an angle of the head of the user is detected by the posture sensor 64. However, the sensitivity adjustment section 720 instructs the position/rotation information acquisition section 730 to neglect a change in the detected angle until the change in the angle exceeds a predetermined value.

Further, the sensitivity adjustment section 720 adjusts the sensitivity of an angle detection of the head on the basis of the zoom magnification acquired from the zoom instruction acquisition section 710. As the zoom magnification becomes larger, the sensitivity of the angle detection of the head is more reduced. When the zooming is performed, a field angle is made small, and therefore an angle detection sensitivity of the head is reduced to thereby suppress vibrations of a display image owing to swinging of the head.

A coordinate conversion section 740 performs a coordinate conversion for generating an image to be displayed on the head-mounted display 100 with a tracking function by using the position and rotation of the head-mounted display 100 acquired by the position/rotation information acquisition section 730.

The image processing section 750 reads out image data from an image storage section 760 and generates an image viewed in a line-of-sight direction from a viewpoint position of the user who wears the head-mounted display 100 at the zoom magnification specified by the zoom instruction acquisition section 710 in accordance with the coordinate conversion by the coordinate conversion section 740 to provide the image for an image providing section 770. Here, the image data may be a moving image or still image content prepared in advance or a rendered computer graphics.

The image providing section 770 provides the image data generated by the image processing section 750 for the head-mounted display 100.

The image processing section 750 stores, as a "past frame," the generated image in the image storage section 760 along with viewpoint information and a frame number. The viewpoint information includes the viewpoint position and line-of-sight direction at the time of drawing the frame.

A viewpoint calculation section 780 calculates a viewpoint position and line-of-sight direction after moving the head on the basis of a variation of the position and rotation of the head-mounted display 100 acquired from the position/rotation information acquisition section 730.

A past frame selection section 790 compares a new viewpoint position and/or line-of-sight direction calculated by the viewpoint calculation section 780 and a viewpoint position and/or line-of-sight direction of the past frame stored in the image storage section 760. When a difference between the viewpoint positions and/or an angle difference between the line-of-sight directions are present within predetermined thresholds, the past frame selection section 790 selects the past frame from the image storage section 760 in accordance with a selection rule. The past frame selection section 790 provides the selected past frame for the image providing section 770.

Before drawing results are generated in the new viewpoint position and line-of-sight direction by using the image processing section 750, the image providing section 770 provides, as a substitute image, the past frame selected by the past frame selection section 790 for the head-mounted display 100.

When a data amount of the past frame stored in the image storage section 760 exceeds a predetermined threshold, a past frame discarding section 800 deletes the past frame from the image storage section 760 in accordance with a discard rule. The past frame discarding section 800 compares the new viewpoint position and/or line-of-sight direction calculated by the viewpoint calculation section 780 and the viewpoint position and/or line-of-sight direction of the past frame stored in the image storage section 760. When the difference between the viewpoint positions and/or the angle difference between the line-of-sight directions exceed the predetermined thresholds, the past frame discarding section 800 may delete the past frame from the image storage section 760 in accordance with the discard rule.

Figure 5:
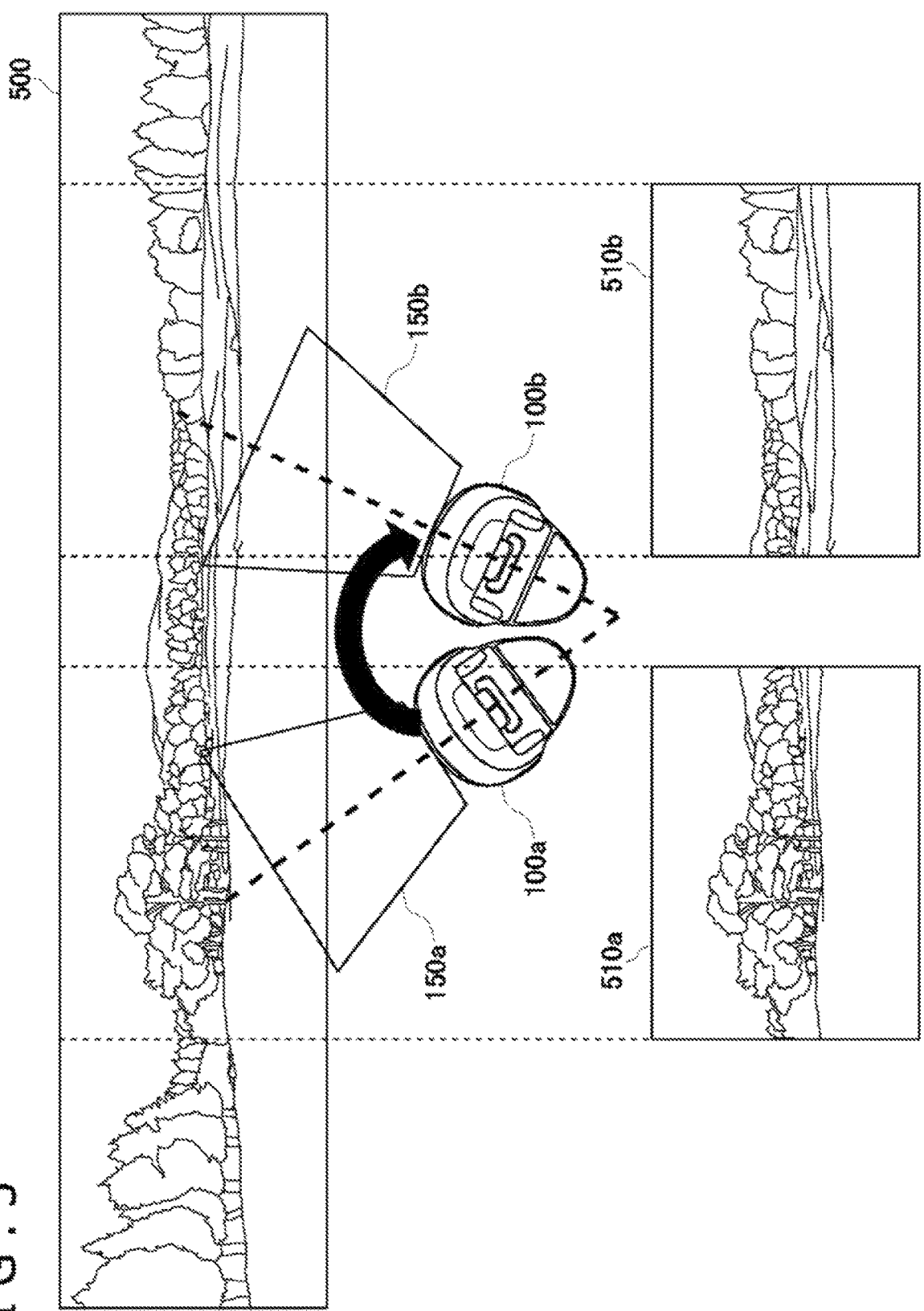
FIG. 5 is a diagram describing the entire periphery image displayed on the head-mounted display.

FIG. 5 is a diagram describing the entire periphery image 500 displayed on the head-mounted display 100. When the user faces a front left side to the entire periphery image 500, an image 510a is displayed in a range of a field angle 150a in the direction of a head-mounted display 100a. Further, when the user turns the neck and faces a front right side, an image 510b is displayed in a range of a field angle 150b in the direction of a head-mounted display 100b.

Even the viewpoint position and line-of-sight direction for viewing the entire periphery image displayed on the head-mounted display 100 are changed in accordance with the motion of the head as described above, and therefore the immersion feeling can be enhanced in the entire periphery image.

Figure 6:
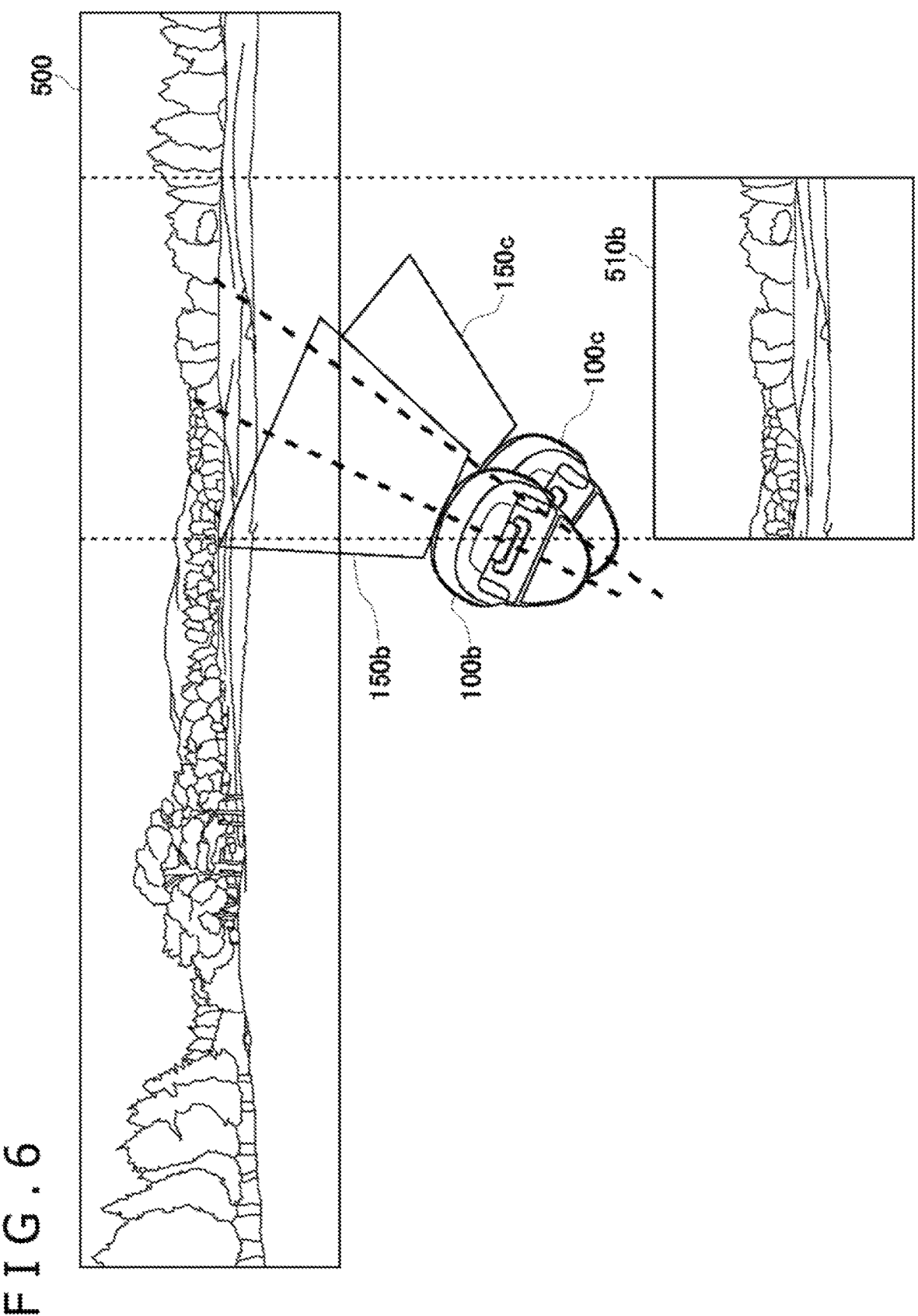
FIG. 6 is a diagram describing a reason that a delay occurs in the entire periphery image displayed on the head-mounted display.

FIG. 6 is a diagram describing a reason that a delay occurs in the entire periphery image displayed on the head-mounted display 100. When the user turns the neck and faces the front right side, the image 510b is generated in a range of the field angle 150b in the direction of the head-mounted display 100b and is displayed on the head-mounted display 100. In reality, at the time of displaying the image 510b, the position and rotation of the head-mounted display 100b have been already changed so as to be represented in a symbol 150c. Therefore, an image to be viewed in the range of the field angle 150c needs to be originally displayed on a head-mounted display 100c. However, an image that is really generated and displayed is the image to be viewed in the range of the field angle 150b in the direction of the head-mounted display 100b slightly before the time. Because of a deviation due to the time difference, an image in a direction that is slightly deviated from the direction of the image viewed by the user may be displayed on the head-mounted display 100 and therefore the user may feel a certain type of "sickness."

Thus, it takes time to detect the rotation of the head-mounted display 100, decide the next drawing range, allow a central processing unit (CPU) to issue a drawing command, allow a graphics processing unit (GPU) to perform rendering, and output a drawn image to the head-mounted display 100. When the drawing is assumed to be performed, for example, at a frame rate of 60 fps (frame/second), even if the CPU operates at sufficiently high speed, a delay occurs for one frame until the rotation of the head-mounted display 100 is detected and the image is output. The delay is approximately 16.67 milliseconds under the condition of the frame rate of 60 fps and the time is a sufficient time for a human being to sense the deviation.

Therefore, in the past, processing that is referred to as "time warp" or "reprojection" has been performed and aimed at making it hard for a human being to sense the deviation. Hereinafter, the "reprojection" will be described and then a method for reducing a drawing delay sense by using the past frame according to the present embodiment will be described.

FIGS. 7(a) and 7(b) are diagrams describing the reprojection. FIG. 7(a) illustrates a view frustum 910 at the time of viewing a virtual space from a viewpoint 900. In FIG. 7(a), an image 920 is displayed in a display range regulated by the view frustum 910. However, in the case in which the user turns the head to the right and moves the viewpoint 900 to the right, when the generated image 920 is directly drawn in the display range regulated by the view frustum 910, the user senses the deviation as illustrated in FIG. 6.

When the head is moved to the right, the image before the eyes ought to flow from the right to the left, to put it more precisely, flow to the lower left. For that purpose, as illustrated in FIG. 7(b), the generated image 920 is displayed in a position deviated at the lower left than a position to be originally displayed. Then, a correct image is late drawn in the original display range regulated by the view frustum 910. The processing is referred to as the reprojection. Through the reprojection, uncomfortable feeling sensed by a human being can be suppressed because the image does not instantaneously follow the motion of the head.

However, when the drawing is performed in the head-mounted display 100 particularly by using the server client system, a communication time is further added to a time required for drawing processing and the delay becomes larger. Therefore, it may be difficult to sufficiently reduce the uncomfortable feeling by using only delay measures according to the reprojection. The generated image 920 is displayed in a position deviated from a position to be originally displayed and then the correct image is drawn in the original display range regulated by the view frustum 910. Further, the drawing of the correct image is delayed in consequence of communication traffic. To solve the above problem, in the present embodiment, usage of the past frame permits the delay sensed by the user to be reduced.

Figure 8:
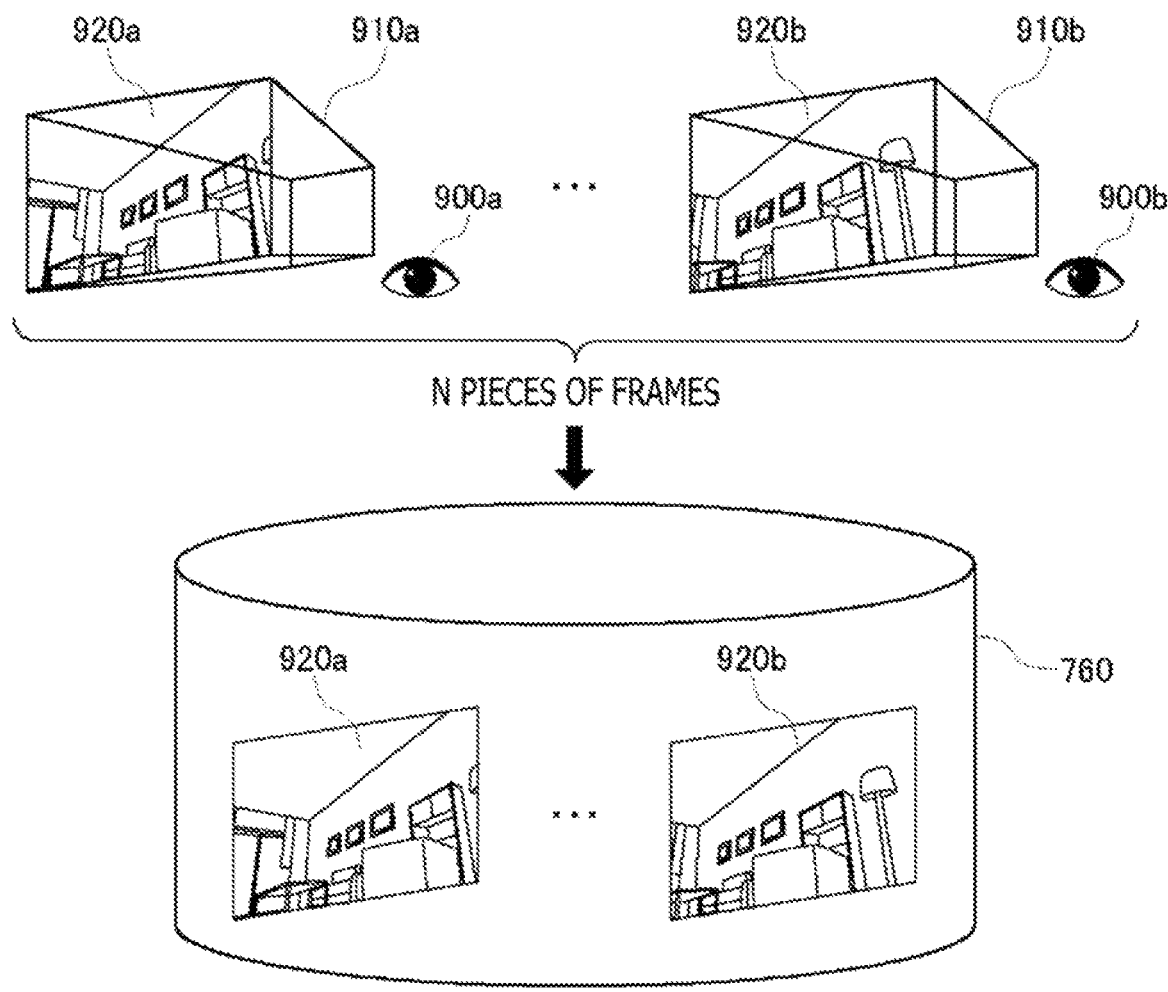
FIG. 8 is a diagram describing an appearance in which a past frame is stored in an image storage section illustrated in FIG. 4.

The drawing processing using the past frame will be schematically described with reference to FIGS. 8 and 9. FIG. 8 is a diagram describing an appearance in which the past frame is stored in the image storage section 760. Images 920a and 920b are drawn in the display range regulated by the view frustums 910a and 910b at the time of viewing the virtual space when moving viewpoints 900a and 900b. Images for N pieces of frames (N is an arbitrary natural number) in the past are stored in the image storage section 760.

Figure 9:
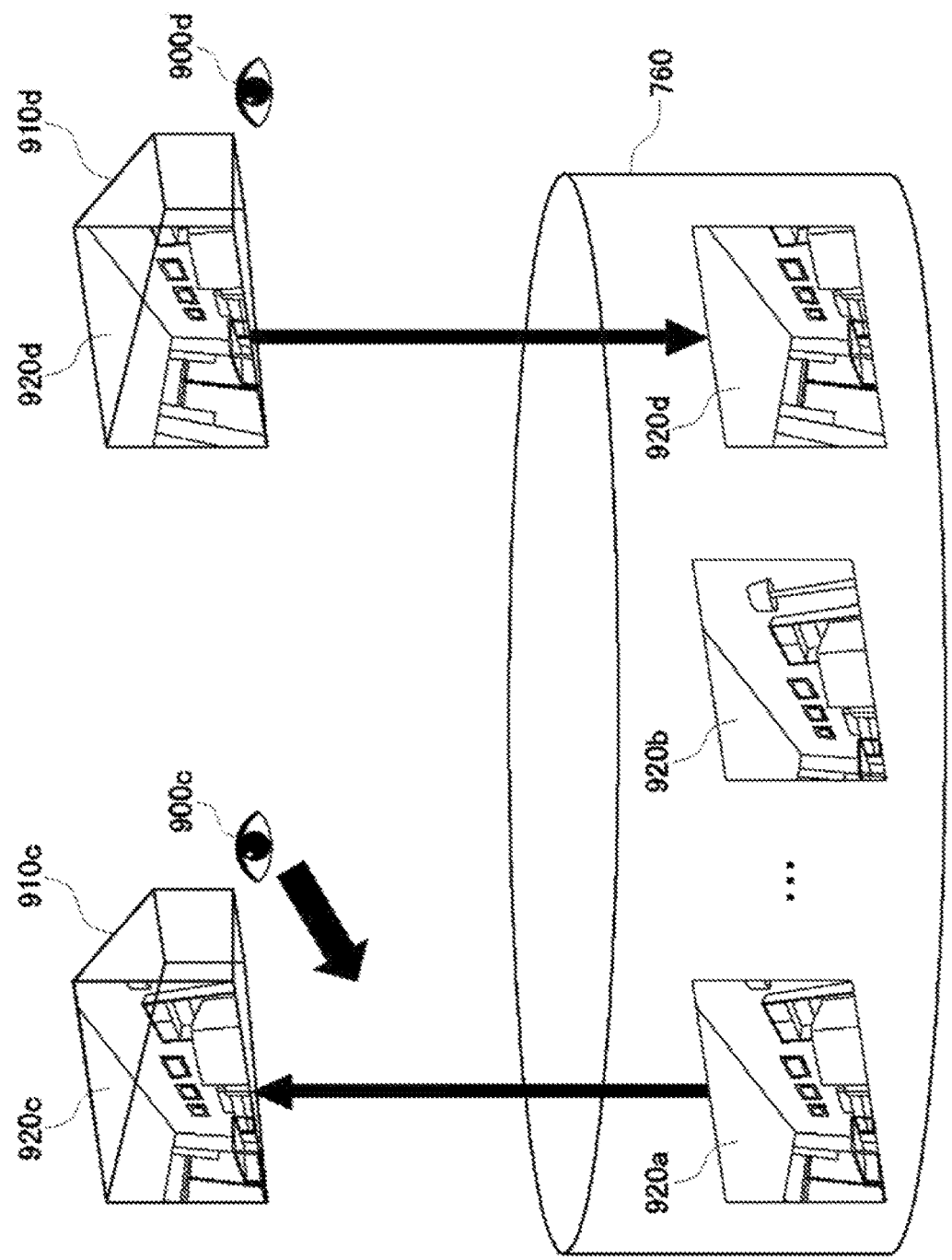
FIG. 9 is a diagram describing an appearance in which the past frame selected from the image storage section illustrated in FIG. 4 is used for drawing processing.

FIG. 9 is a diagram describing an appearance in which the past frame selected from the image storage section 760 is used for the drawing processing. A viewpoint 900c is assumed to move in the left direction. It takes time to obtain a drawing result at a new viewpoint. For that purpose, the frame 920a that is drawn in the past at a viewpoint nearest to the viewpoint 900c is selected from among frames of the images stored in the image storage section 760. The selected frame 920a is directly used, or the selected frame 920a that is subjected to reprojection processing if necessary is displayed as a substitute image 920c in the display range regulated by a view frustum 910c at the time of viewing the virtual space from the viewpoint 900c.

Then, an image 920d to be originally drawn is generated and displayed in the display range of the view frustum 910c at the time of viewing the virtual space from a viewpoint 900d in a movement destination. The past frame 920a is displayed as the substitute image 920c until the image 920d that is a final drawing result at the viewpoint 900d is displayed, and therefore the delay sensed by the user is reduced. The image 920d that is the final drawing result at the viewpoint 900d is stored as a new past frame in the image storage section 760.

Figure 10:
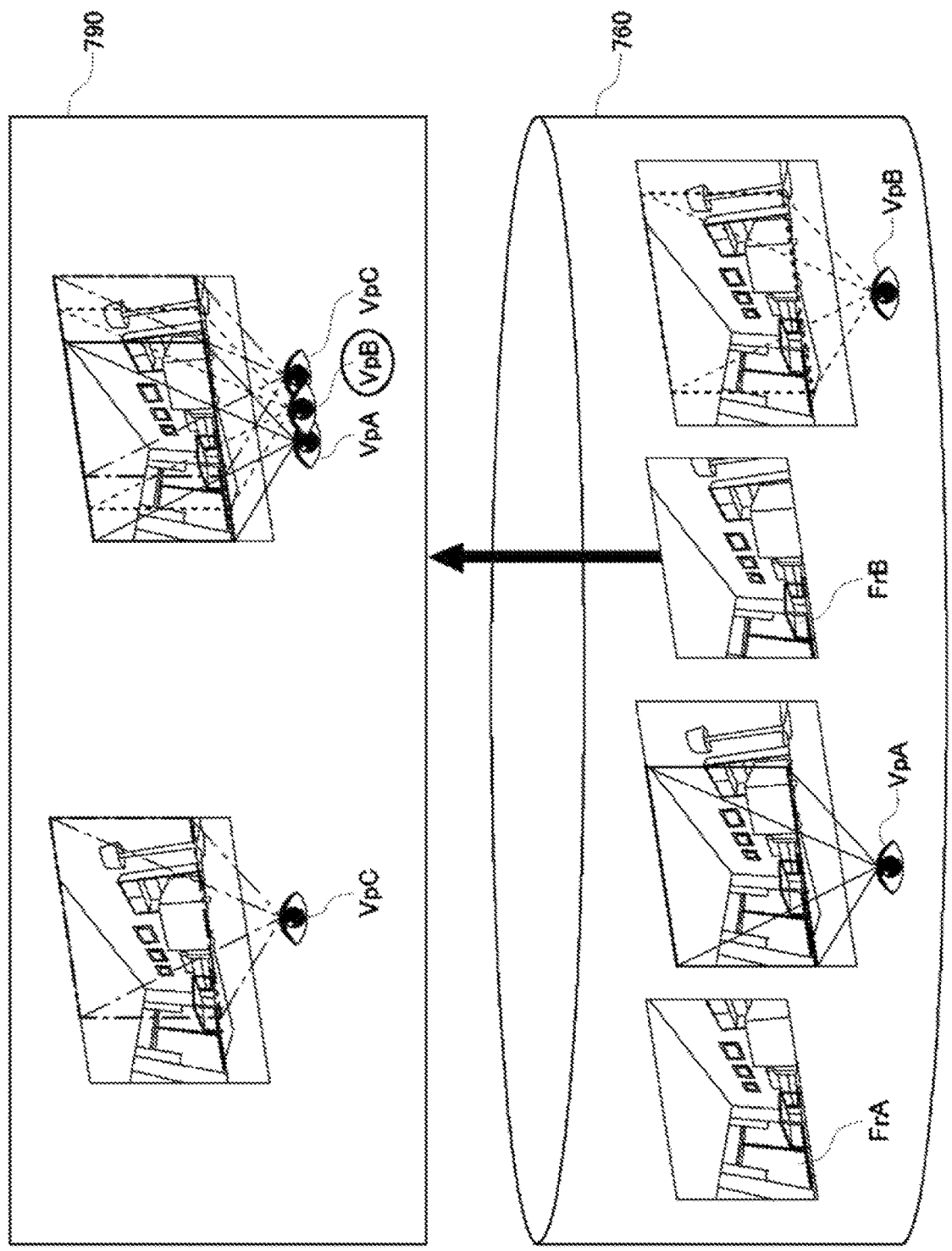
FIG. 10 is a diagram describing past frame selection processing by a past frame selection section illustrated in FIG. 4.

FIG. 10 is a diagram describing selection processing of the past frame by the past frame selection section 790. Here, a case in which a rule such that "a past frame that is drawn at a viewpoint nearest to a current viewpoint is selected" is adopted as the selection rule will be described.

To put it briefly, a frame FrA drawn at a first viewpoint VpA and a frame FrB drawn at a second viewpoint VpB are assumed to be stored as the past frame in the image storage section 760. The past frame selection section 790 selects the substitute image viewed from a current viewpoint VpC from among the past frames stored in the image storage section 760. When the current viewpoint VpC is compared with the first viewpoint VpA and the second viewpoint VpB, the second viewpoint VpB is near to the current viewpoint VpC. In the result, the past frame selection section 790 selects the frame FrB drawn at the second viewpoint VpB nearest to the current viewpoint VpC as the substitute image in the current viewpoint VpC.

Figure 11:
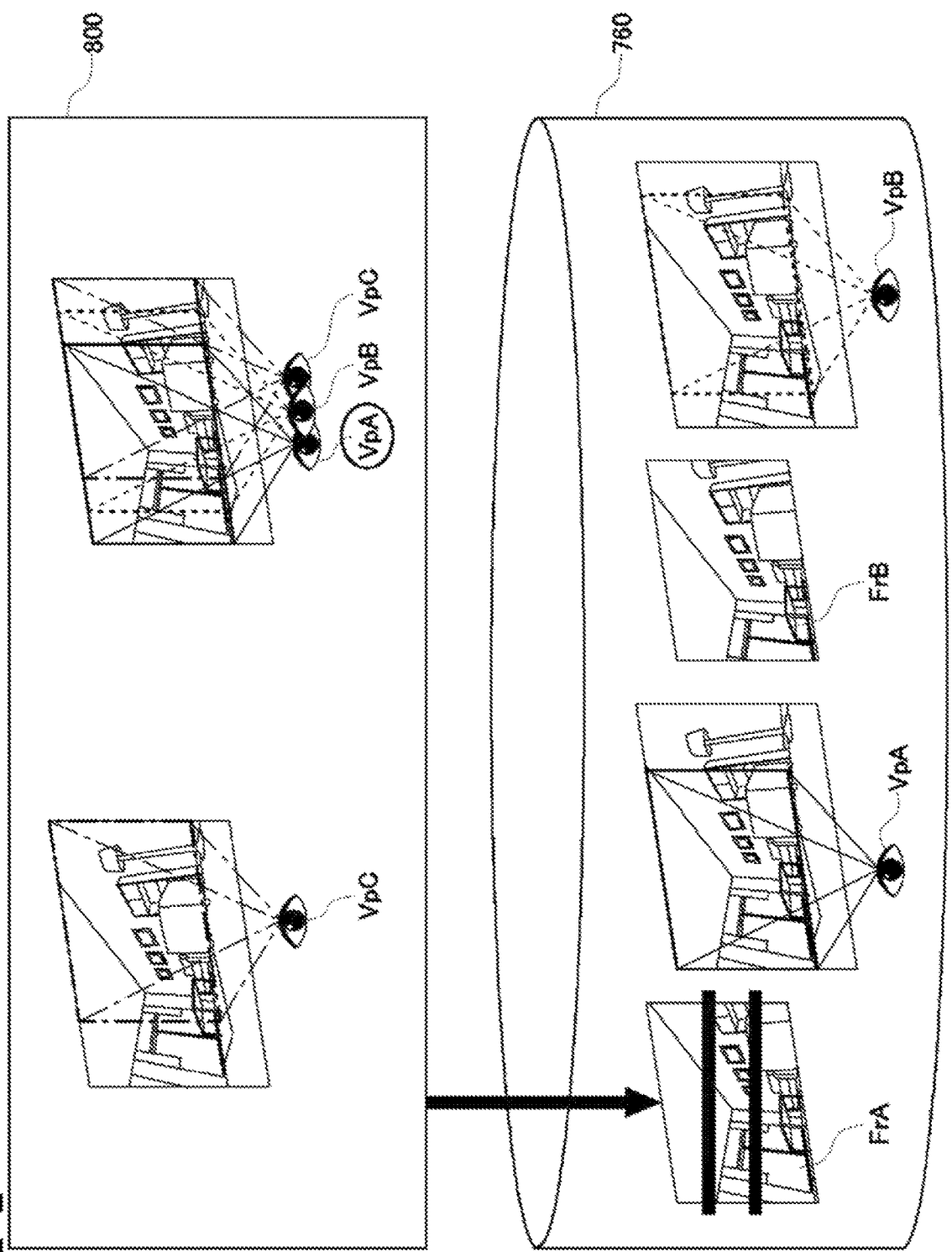
FIG. 11 is a diagram describing past frame discarding processing by a past frame discarding section illustrated in FIG. 4.

FIG. 11 is a diagram describing discarding processing of the past frame by the past frame discarding section 800. Here, a case in which a rule such that "the past frame that is drawn at a viewpoint most distant from the current viewpoint is discarded" is adopted as the discard rule will be described.

To put it briefly, the frame FrA drawn at the first viewpoint VpA and the frame FrB drawn at the second viewpoint VpB are assumed to be stored as the past frame in the image storage section 760. When the current viewpoint VpC is compared with the first viewpoint VpA and the second viewpoint VpB, the first viewpoint VpA is distant from the current viewpoint VpC. In the result, the past frame discarding section 800 deletes the frame FrA that is drawn at the first viewpoint VpA most distant from the current viewpoint VpC from the image storage section 760.

Figure 12:
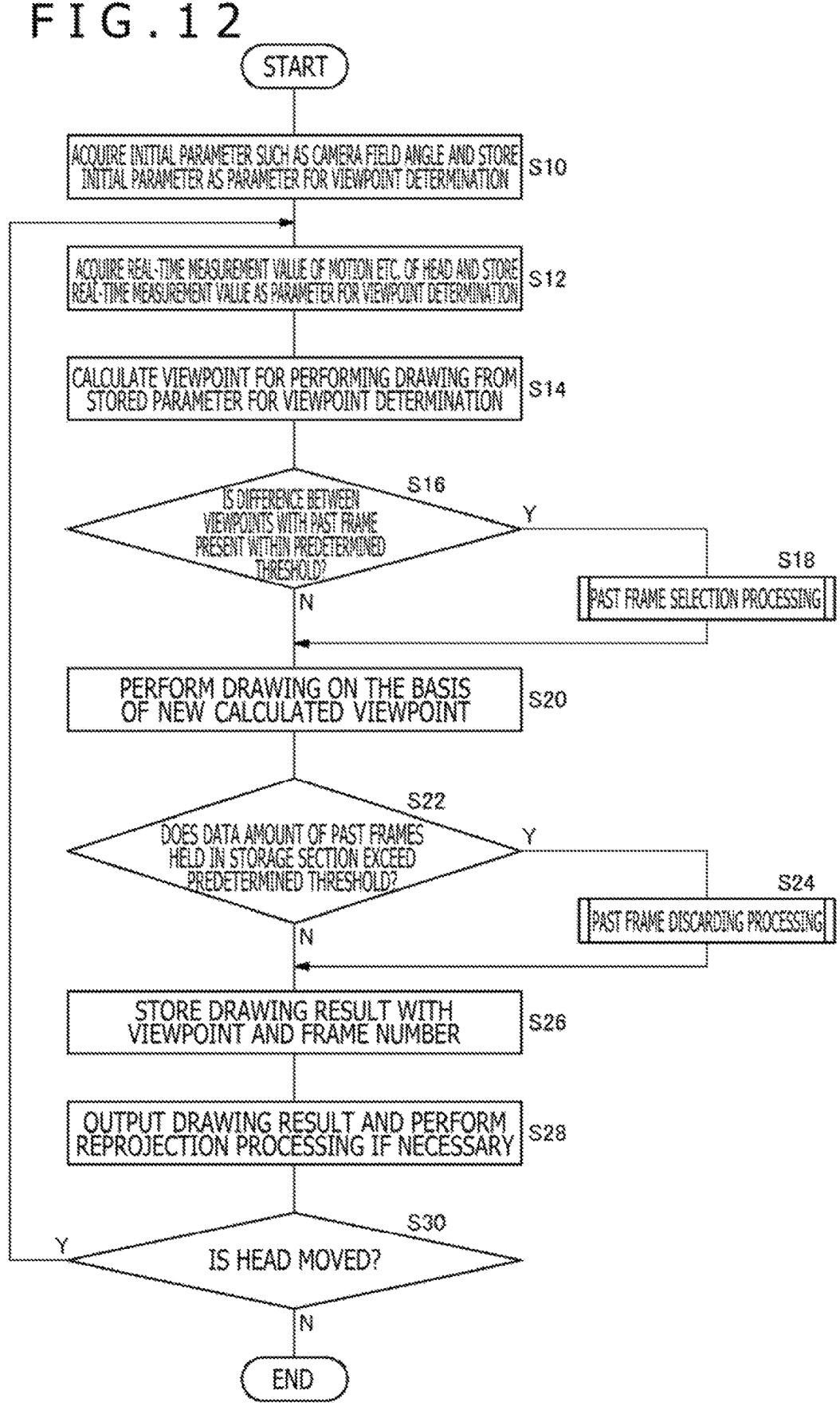
FIG. 12 is a flowchart illustrating a procedure of the drawing processing using the past frame by the image generation apparatus illustrated in FIG. 4 in the case of a stand-alone system.

FIG. 12 is a flowchart illustrating a procedure of the drawing processing using the past frame by the image generation apparatus 700 in the case of the stand-alone system.

The image generation apparatus 700 acquires a parameter determined during initial setting, such as a display resolution and camera field angle of the head-mounted display 100 and stores the parameter in a storage section as a parameter for viewpoint determination (S10).

The position/rotation information acquisition section 730 of the image generation apparatus 700 acquires a real-time measurement value indicating the motion etc. of the head of the user who wears the head-mounted display 100 and stores the real-time measurement value in the storage section as the parameter for viewpoint determination (S12).

The viewpoint calculation section 780 of the image generation apparatus 700 calculates the viewpoint position and line-of-sight direction for performing the drawing on the basis of the stored parameter for viewpoint determination (S14).

The past frame selection section 790 compares the viewpoint position and line-of-sight direction of the past frame stored in the image storage section 760 and the viewpoint position and line-of-sight direction calculated by the viewpoint calculation section 780 and determines whether a difference between the viewpoint positions and an angle difference between the line-of-sight directions are present within predetermined thresholds (S16).

If the difference between the viewpoint positions and the angle difference between the line-of-sight directions are present within the predetermined thresholds (Y at S16), the past frame selection section 790 performs past frame selection processing (S18). Details of the past frame selection processing will be described below. The past frame selection processing is performed, and then the process proceeds to step S20.

If the difference between the viewpoint positions and the angle difference between the line-of-sight directions exceed the predetermined thresholds (N at S16), the past frame selection processing of step S18 is not performed and the process proceeds to step S20.

The image processing section 750 draws an image viewed in the line-of-sight direction from a current viewpoint position and provides the drawn image for the image providing section 770 (S20).

The past frame discarding section 800 determines whether the data amount of the past frames stored in the image storage section 760 exceeds a predetermined threshold (S22). The predetermined threshold is set under the control of the data amount capable of being held in the image generation apparatus 700 in consideration of a storage capacity of the image generation apparatus 700.

If the data amount of the past frames stored in the image storage section 760 exceeds the predetermined threshold (Y at S22), the past frame discarding section 800 performs past frame discarding processing (S24). Details of the past frame discarding processing will be described below. The past frame discarding processing is performed, and then the process proceeds to step S26.

If the data amount of the past frames stored in the image storage section 760 is present within the predetermined threshold (N at S22), the past frame discarding processing of step S24 is not performed and the process proceeds to step S26.

The image processing section 750 stores, as the past frame, the drawing result of the image viewed in the line-of-sight direction from the current viewpoint position in the image storage section 760 along with the viewpoint and the frame number (S26).

The image providing section 770 outputs the drawing result of the image viewed in the line-of-sight direction from the current viewpoint position to the head-mounted display 100 and performs the reprojection processing if necessary (S28).

If the head of the user is moved (Y at S30), the process returns to step S12 and subsequent processes are repeated. If the head of the user is not moved (N at S30), the drawing processing using the past frame ends and the process returns to normal drawing processing.

FIG. 13 is a flowchart illustrating a procedure of the past frame selection processing of step S18 illustrated in FIG. 12.

The past frame selection section 790 selects the past frame from the image storage section 760 on the basis of the selection rule (S40).

Examples of the selection rule include the following.
Select a newest frame among from the stored past frames
Select the past frame drawn at a viewpoint nearest to the current viewpoint on the basis of the difference between the viewpoint positions and the angle difference between the line-of-sight directions
Perform matching of the immediately drawn frame and the past frame and select the past frame that most closely approximates the immediately drawn frame
Select the past frame having a highest selection frequency The past frame selection section 790 outputs the selected past frame as the substitute image to the head-mounted display 100 and performs the reprojection processing if necessary (S42).

FIG. 14 is a flowchart illustrating a procedure of the past frame discarding processing of step S24 illustrated in FIG. 12.

The past frame discarding section 800 selects the past frame to be discarded from the image storage section 760 on the basis of the discard rule (S50).

Examples of the discard rule include the following.
Discard an oldest frame from among the stored past frames
Discard the past frame drawn at a viewpoint most distant from the current viewpoint on the basis of the difference between the viewpoint positions and the angle difference between the line-of-sight directions
Perform matching of the immediately drawn frame and the past frame and discard the past frame that does not most closely approximate the immediately drawn frame
Discard the past frame having a lowest selection frequency The past frame discarding section 800 deletes the selected past frame from the image storage section 760 (S52).

In the above-described flowchart, a case of the stand-alone system in which the client 200 is not connected to the server 400 and is used as a single body is described. Next, a case of the server client system in which the client 200 is connected to the server 400 will be described.

Figure 15:
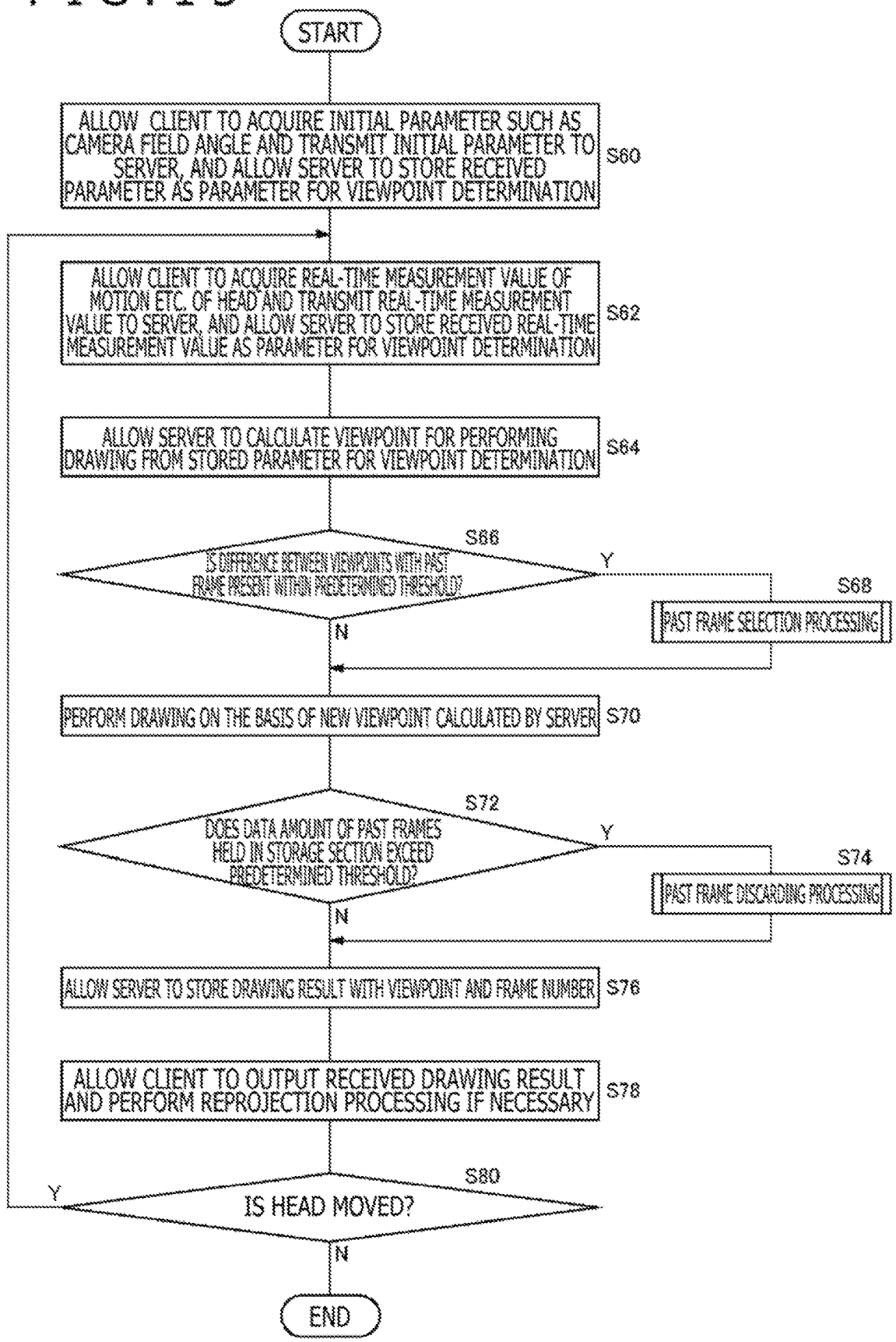
FIG. 15 is a flowchart illustrating a procedure of the drawing processing using the past frame by the image generation apparatus illustrated in FIG. 4 in the case of a server client system.

FIG. 15 is a flowchart illustrating a procedure of the drawing processing using the past frame by the image generation apparatus 700 in the case of the server client system.

The client 200 acquires a parameter determined during initial setting, such as the display resolution and camera field angle of the head-mounted display 100 and transmits the parameter to the server 400. The server 400 stores the received parameter in the storage section as the parameter for viewpoint determination (S60).

The client 200 acquires the real-time measurement value of the motion etc. of the head of the user who wears the head-mounted display 100 and transmits the real-time measurement value to the server 400. Then, the position/rotation information acquisition section 730 of the server 400 stores the received real-time measurement value in the storage section as the parameter for viewpoint determination (S62).

The viewpoint calculation section 780 of the server 400 calculates the viewpoint position and line-of-sight direction for performing drawing from the stored parameter for viewpoint determination (S64).

The past frame selection section 790 of the server 400 compares the viewpoint position and line-of-sight direction of the past frame stored in the image storage section 760 and the viewpoint position and line-of-sight direction calculated by the viewpoint calculation section 780 and determines whether a difference between the viewpoint positions and an angle difference between the line-of-sight directions are present within predetermined thresholds (S66).

If the difference between the viewpoint positions and the angle difference between the line-of-sight directions are present within the predetermined thresholds (Y at S66), the past frame selection section 790 performs the past frame selection processing (S68). Details of the past frame selection processing will be described below. The past frame selection processing is performed, and then the process proceeds to step S70.

If the difference between the viewpoint positions and the angle difference between the line-of-sight directions exceed the predetermined thresholds (N at S66), the past frame selection processing of step S68 is not performed and the process proceeds to step S70.

The image processing section 750 of the server 400 draws an image viewed in the line-of-sight direction from the current viewpoint position and provides the drawn image for the image providing section 770 (S70).

The past frame discarding section 800 of the server 400 determines whether the data amount of the past frames stored in the image storage section 760 exceeds a predetermined threshold (S72). The predetermined threshold is set on the basis of the data amount capable of being held in the server 400 in consideration of a high-capacity storage apparatus of the server 400. In the case of the cloud service, the storage capacity is sufficiently large, and therefore a large number of past frames that are transmitted to the plurality of clients 200 can be held.

If the data amount of the past frames stored in the image storage section 760 exceeds the predetermined threshold (Y at S72), the past frame discarding section 800 performs the past frame discarding processing (S74). Details of the past frame discarding processing will be described below. The past frame discarding processing is performed, and then the process proceeds to step S76.

If the data amount of the past frames stored in the image storage section 760 is present within the predetermined threshold (N at S72), the past frame discarding processing of step S74 is not performed and the process proceeds to step S76.

The image processing section 750 of the server 400 stores, as the past frame, the drawing result of the image viewed in the line-of-sight direction from the current viewpoint position in the image storage section 760 along with the viewpoint and the frame number (S76).

The image providing section 770 of the server 400 transmits the drawing result of the image viewed in the line-of-sight direction from the current viewpoint position to the client 200. The client 200 outputs the received drawing result to the head-mounted display 100 and performs the reprojection processing if necessary (S78).

If the head of the user is moved (Y at S80), the process returns to step S62 and subsequent processes are repeated. If the head of the user is not moved (N at S80), the drawing processing using the past frame ends and the process returns to the normal drawing processing.

Since the past frame selection processing of step S68 is not so different from processing in the case of the stand-alone system illustrated in FIG. 13, figures are omitted and only procedures will be described. The past frame selection section 790 of the server 400 selects the past frame from the image storage section 760 on the basis of the selection rule and transmits the past frame to the client 200. The client 200 outputs the received past frame as the substitute image to the head-mounted display 100 and performs the reprojection processing if necessary.

Since the past frame selection processing of step S74 is not so different from the processing in the case of the stand-alone system illustrated in FIG. 14, figures are omitted and only procedures will be described. The past frame discarding section 800 of the server 400 selects the past frame to be discarded from the image storage section 760 on the basis of the discard rule. The past frame discarding section 800 deletes the selected past frame from the image storage section 760.

In the descriptions, a case in which the server 400 transmits the drawing result to a single client 200 is described; further, the server 400 may transmit the drawing result to the plurality of clients 200. For example, when a game application is performed by using the plurality of clients 200, the plurality of users view the same virtual space from different viewpoints while wearing the head-mounted display 100. In such a case, a past frame of an image drawn for one client 200 is stored in the server 400. Then, the past frame may be reused as the substitute image in the case in which another client 200 views the virtual space from a similar viewpoint.

As described above, according to the image generation apparatus 700 of the present embodiment, the viewpoint position and the line-of-sight direction are changed in accordance with movements of the head of the user who wears the head-mounted display 100. In such a case, the past frame suitable for a new viewpoint position and line-of-sight direction is reused from among the past frames of the images drawn in the past and is drawn as the substitute image. In the result, even if the delay is caused by the drawing processing or communication, the substitute image is displayed. Therefore, it is hard for the user to sense the delay and the sickness can be prevented.

Hereinafter, several use cases will be described. A first use case is a mode in which a device under the user's hand performs drawing by using the past frame without connecting the device to a network. When the device under the user's hand has a sufficient storage capacity, the drawing result in the past is stored and reused to thereby output the drawing in which the delay required for the drawing processing is hidden.

A second use case is a mode in which the drawing is performed in a cloud server and the drawing result is transmitted to the client. The cloud server has a storage apparatus with higher capacity than that of the device under the user's hand, and therefore can hold and reuse many drawing results in the past as compared with the device under the user's hand. Further, in the cloud service, when the plurality of clients 200 view the same virtual space, a drawing result of one client can be used by another client.

A third use case is a mode in which reproduction of a moving image content of the entire circumference in 360 degrees is performed by the cloud server and only an area viewed in the line-of-sight direction of the user is segmented to transmit the area to the client. For example, hardware with high performance is needed for the reproduction of a content with high resolution such as 4 K resolution and 8 K resolution. An environment is needed for providing hardware with higher performance than that of a terminal under the user's hand as in the cloud service.

To transmit all contents with the high resolution such as 4 K resolution and 8 K resolution to the clients, an ultra-wide-band network communication is needed. For that purpose, only an area viewed in the line-of-sight direction of the user is segmented to transmit the area to the client. This process permits the necessary network band to be reduced while using a capability of the cloud service. However, only a portion of an area of the reproduced moving images is transmitted to the client, and therefore when the viewpoint moves, the reprojection processing is needed. To solve the problem, frames of the image segmented from a 360-degree moving image are stored in the cloud server. Further, the past frame suitable for a viewpoint at the time when the client reproduces a 360-degree moving image content is selected and reused as the substitute image to thereby hide the delay.

The present invention has been described on the basis of the embodiments. The embodiments are illustrative, and they can be recognized by those skilled in the art that various modifications are possible in regard to suitable combinations of the components and the processes of the embodiments and that also such modifications fall within the scope of the present invention. Such modifications are described.

REFERENCE SIGNS LIST

10 Control section, 20 Input interface, 30 Output interface, 32 Backlight, 40 Communication control section, 42 Network adapter, 44 Antenna, 50 Storage section, 64 Posture sensor, 70 External input/output terminal interface, 72 External memory, 80 Clock section, 100 Head-mounted display, 200 Client, 300 Interface, 400 Server, 500 Entire periphery image, 600 Network, 700 Image generation apparatus, 710 Zoom instruction acquisition section, 720 Sensitivity adjustment section, 730 Position/rotation information acquisition section, 740 Coordinate conversion section, 750 Image processing section, 760 Image storage section, 770 Image providing section, 780 Viewpoint calculation section, 790 Past frame selection section, 800 Past frame discarding section.

INDUSTRIAL APPLICABILITY

The present invention can be applied to a technique for generating an image.

The invention claimed is:

1. An image generation apparatus for compensating for drawing delays, the image generating apparatus comprising:
    an image generation section that draws a display image viewed in a line-of-sight direction from a viewpoint position at a certain time,
    wherein the display image displays a virtual three-dimensional space from the viewpoint position on a display of a non-transmissive head mounted display (HMD),
    a storage section that holds already displayed display images as past frames for a predetermined period of time;
    a selection section that selects a substitute image to be viewed in the line-of-sight direction from a current viewpoint position from among the past frames held in the storage section; and
    an image providing section that displays the substitute image on the display, to compensate for drawing delays, before displaying a new image viewed in the line-of-sight direction from the current viewpoint position drawn by the image generation section,
    wherein the display image, the past frames, and the substitute image are all full frame images covering an entirety of the display.

2. The image generation apparatus according to claim 1, wherein
    the selection section compares at least one of the viewpoint position and line-of-sight direction of the past frame held in the storage section and at least one of the current viewpoint position and the line-of-sight direction and selects, as the substitute image, a past frame in which at least one of a difference between the viewpoint positions and an angle difference between the line-of-sight directions is smallest.

3. The image generation apparatus according to claim 2, wherein
    when at least one of the difference between the viewpoint positions and the angle difference between the line-of-sight directions is present within a predetermined threshold, the selection section selects the substitute image from among the past frames held in the storage section, and when at least one of the difference between the viewpoint positions and the angle difference between the line-of-sight directions exceeds the predetermined threshold, the selection section does not select the substitute image and the image providing section does not output the substitute image and provides the display image viewed in the line-of-sight direction from the current viewpoint position drawn by the image generation section.

4. The image generation apparatus according to claim 1, further comprising:
    a discarding section that compares, in the past frames held in the storage section, at least one of the viewpoint position and line-of-sight direction of the past frame held in the storage section and at least one of the current viewpoint position and the line-of-sight direction and deletes, from the storage section, a past frame in which at least one of the difference between the viewpoint positions and the angle difference between the line-of-sight directions is largest.

5. An image generation system comprising:
    a server; and
    a client that is connected to the server via a network, wherein
    the server includes
    an image generation section that draws a display image viewed in a line-of-sight direction from a viewpoint position at a certain time, a storage section that holds a plurality of already displayed display images as past frames,
    a selection section that selects a substitute image to be viewed in the line-of-sight direction from a current viewpoint position from among the past frames held in the storage section, and
    an image providing section that transmits the substitute image to the client before providing a new display image viewed in the line-of-sight direction from the current viewpoint position drawn by the image generation section,
    wherein the display image displays a virtual three-dimensional space from the viewpoint position, and
    wherein the display image, the past frames, and the substitute image are all full frame images covering an entirety of a display of a non-transmissive head mounted display (HMD),
    and
    the client includes
    a reprojection section that performs processing of deviating the substitute image received from the server in accordance with a motion amount of at least one of the viewpoint position and the line-of-sight direction and displaying the deviated image on the display.

6. An image generation method comprising:
    drawing a display image viewed in a line-of-sight direction from a viewpoint position at a certain time,
    wherein the display image displays a virtual three-dimensional space from the viewpoint position on a display of a non-transmissive head mounted display (HMD);
    storing already displayed display images as past frames for a predetermined period of time;

selecting a substitute image to be viewed in the line-of-sight direction from a current viewpoint position from among the past frames; and outputting the substitute image to the display before providing a new image viewed in the line-of-sight direction from the current viewpoint position drawn to the display, wherein the display image, the past frames, and the substitute image are all full frame images covering an entirety of the display.

* * * * *